US011020751B2

(12) United States Patent
Flores

(10) Patent No.: US 11,020,751 B2
(45) Date of Patent: *Jun. 1, 2021

(54) SEPARATION PROCESS FOR PLASTICS MATERIALS

(71) Applicant: Berry Plastics Corporation, Evansville, IN (US)

(72) Inventor: Robert Flores, Mount Vernon, IN (US)

(73) Assignee: Berry Plastics Corporation, Evansville, IN (US)

( * ) Notice: Subject to any disclaimer, the term of this patent is extended or adjusted under 35 U.S.C. 154(b) by 692 days.

This patent is subject to a terminal disclaimer.

(21) Appl. No.: 14/721,348

(22) Filed: May 26, 2015

(65) Prior Publication Data

US 2015/0251191 A1 Sep. 10, 2015

Related U.S. Application Data

(63) Continuation of application No. 13/204,501, filed on Aug. 5, 2011, now Pat. No. 9,067,214.

(60) Provisional application No. 61/371,559, filed on Aug. 6, 2010.

(51) Int. Cl.
| | | |
|---|---|---|
| *B03B 5/00* | (2006.01) | |
| *B03B 5/30* | (2006.01) | |
| *B03B 5/44* | (2006.01) | |
| *B29B 17/02* | (2006.01) | |
| *B03B 5/28* | (2006.01) | |

(52) U.S. Cl.
CPC .................. *B03B 5/30* (2013.01); *B03B 5/28* (2013.01); *B03B 5/442* (2013.01); *B29B 17/02* (2013.01); *B29B 2017/0203* (2013.01); *B29B 2017/0244* (2013.01); *Y02W 30/52* (2015.05); *Y02W 30/62* (2015.05)

(58) Field of Classification Search
CPC .. B03B 5/28; B03B 5/442; B03B 5/30; B03B 5/44; B29B 17/02; B29B 2017/0203; B29B 2017/0244; B29B 17/0042; C08J 11/06; C08J 11/08
USPC .......... 209/3, 17, 162, 171, 172, 172.5, 173; 521/40.5
See application file for complete search history.

(56) References Cited

U.S. PATENT DOCUMENTS

| | | |
|---|---|---|
| 1,195,264 A | 8/1916 | Pennington |
| 1,604,022 A | 10/1926 | Clark |
| 2,031,943 A | 2/1936 | Dyer et al. |
| 2,879,889 A | 3/1959 | Rakowsky |
| 3,822,015 A | 7/1974 | Kornberg et al. |

(Continued)

FOREIGN PATENT DOCUMENTS

| | | |
|---|---|---|
| DE | 38 00 204 A1 | 7/1989 |
| GB | 591102 | 8/1947 |

OTHER PUBLICATIONS

International search report and written opinion from PCT/US2011/046749 dated Jan. 12, 2012, 17 pages.

(Continued)

*Primary Examiner* — Charles A Fox
*Assistant Examiner* — Kalyanavenkateshware Kumar
(74) *Attorney, Agent, or Firm* — Barnes & Thornburg LLP

(57) ABSTRACT

A materials-separation process includes a sorting operation in which plastics materials including at least first and second plastics materials are sorted from paper and metal materials so that the first plastics material may be separated from the second plastics material.

20 Claims, 2 Drawing Sheets

(56) References Cited

U.S. PATENT DOCUMENTS

| | | | |
|---|---|---|---|
| 4,119,533 A | | 10/1978 | Saitoh et al. |
| 4,830,188 A | | 5/1989 | Hannigan et al. |
| 5,226,926 A | * | 7/1993 | Matsuzaki ............... B29B 17/00 |
| | | | 44/530 |
| 5,236,603 A | | 8/1993 | Sampson |
| 5,248,041 A | * | 9/1993 | Deiringer ................. B03B 1/04 |
| | | | 209/11 |
| 5,255,859 A | | 10/1993 | Peacock et al. |
| 5,397,066 A | | 3/1995 | Leitman et al. |
| 5,653,867 A | | 8/1997 | Jody et al. |
| 5,740,918 A | | 4/1998 | Hayashi et al. |
| 5,801,204 A | * | 9/1998 | Johansson ................ C08J 11/08 |
| | | | 521/41 |
| 5,894,996 A | | 4/1999 | Williams |
| 5,951,940 A | | 9/1999 | Nosker et al. |
| 7,172,143 B2 | | 2/2007 | Vandeputte |
| 2005/0173310 A1 | * | 8/2005 | Bork ........................ B03B 5/28 |
| | | | 209/172 |
| 2009/0065404 A1 | | 3/2009 | Paspek et al. |

OTHER PUBLICATIONS

"2007 United States National Post-Consumer Plastics Bottle Recycling Report", Association of Postconsumer Plastic Recyclers, American Chemistry Council, 2009, 9 pages.

"2008 United States National Post-Consumer Plastics Bottle Recycling Report", ssociation of Postconsumer Plastic Recyclers, American Chemistry Council, 2009, 10 pages.

"2007 United States National Post-Consumer Report on Non-Bottle Rigid Plastics Recycling", American Chemistry Council, 2009, 6 pages.

"2008 United States National Post-Consumer Report on Non-Bottle Rigid Plastics Recycling", American Chemistry Council, 2010, 10 pages.

"The Association of Postconsumer Plastic Recyclers Design for Recyclability Program", Association of Postconsumer Plastic Recyclers, 2009, 29 pages.

"Hydrocyclone", Wikipedia, the free encyclopedia, www.wikipedia.org/wiki/Hydrocyclone, visited Jul. 21, 2011, 3 pages.

"Float Sink Tank—Plastic Separation", Polymer Recovery Systems, www.prsi.com, visited Jul. 21, 2011, 2 pages.

"Innovative Centrifuge Technology, SortiCanter for plastics recycling" Flottweg Separation Technology, 8 pages.

* cited by examiner

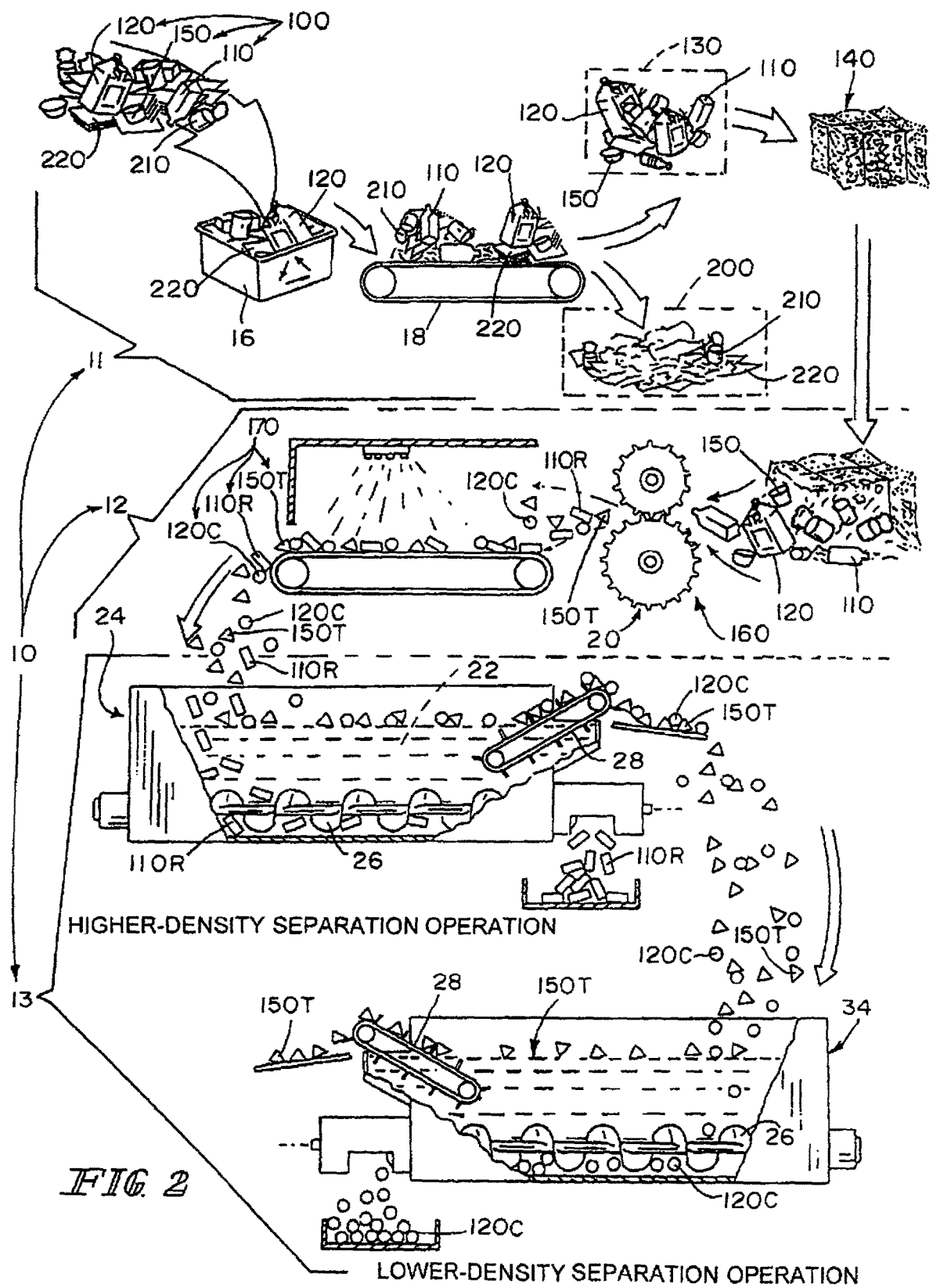

SEPARATION PROCESS FOR PLASTICS MATERIALS

PRIORITY CLAIM

This application is a continuation of U.S. application Ser. No. 13/204,501, filed Aug. 5, 2011, which claims priority under 35 U.S.C. § 119(e) to U.S. Provisional Application No. 61/371,559, filed Aug. 6, 2010, each of which is expressly incorporated by reference herein.

BACKGROUND

The present disclosure relates to a materials separation process, and particularly to a process for separating recyclable materials. More particularly, the present disclosure relates to a process for separating one plastics material from another.

SUMMARY

According to the present disclosure, various types of plastics materials are separated from one another in a materials-separation process. The process may be used to sort a first plastics material from a second plastics material.

In illustrative embodiments, the materials-separation process includes a materials-collection stage, a materials-preparation stage, and a materials-separation stage. In the materials-collection stage, metal materials, paper materials, and plastic materials are collected and the plastics materials are separated from the paper and metal materials using any suitable technique. In the materials-preparation stage, the plastics materials are ground and cleaned. Next, the plastics materials are separated from one another in the materials-separation stage. During the material-separation stage, a higher-density fluid is used in higher-density separation operation and a lower-density fluid is used in a subsequent lower-density separation operation.

In the material-separation stage, the higher-density separation operation is carried out in which flakes made from all of the plastics materials are placed in a higher-density fluid separator that allows flakes made of a first plastics material to sink in the higher-density fluid and thus be separated from flakes that are made from a second and third plastics material float in the higher-density fluid. For example, various plastics materials such as polystyrene (PS), polyvinyl chloride (PVC), and polyethylene terephthalate (PET) sink in the higher-density fluid. Other plastics materials such as polypropylene (PP) and high-density polyethylene (HDPE) float in the higher-density fluid.

In illustrative embodiments, the material-separation stage further includes the subsequent lower-density separation operation in which flakes made of the second and third plastics materials are placed in lower-density fluid separator. The second plastics material sinks in the lower-density fluid while the third plastics material floats in the lighter-density fluid. In an illustrative embodiment, the second plastics material is high-density polyethylene and the third plastics material is polypropylene.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 2 is a perspective and diagrammatic view of an illustrative materials-separation process in accordance with the present disclosure showing that the materials-separation process includes the operations of depositing paper, metal, and plastics materials into a recycling bin, sorting the materials to establish a plastics-materials collection and a non-plastics materials collection, baling the materials in the plastics-materials collection to produce a mixed-plastics bale comprising three types of plastics materials, breaking the mixed-plastics bale to establish a stream of plastics materials, grinding the stream to produce the flakes which are illustratively shown as rectangle-shaped flakes representing a first plastics material, circle-shaped flakes representing a second plastics material, and triangle-shaped flakes representing a third plastics material, and finally depositing the flakes into a tank filled with a higher-density fluid to separate (in a higher-density separation operation) the first plastics material (rectangle-shaped flakes) which sinks in the higher-density fluid from the second and third plastics material flakes (circle-shaped and triangle-shaped flakes) which float in the higher-density fluid and then depositing the second and third plastics materials into another tank filled with a lower-density fluid to separate (in a lower-density separation operation) the second plastics material flakes (circle-shaped flakes) which sink in the lower-density fluid from the third plastics material flakes (triangle-shaped flakes) which float in the lower-density fluid.

DETAILED DESCRIPTION

Figure 1:
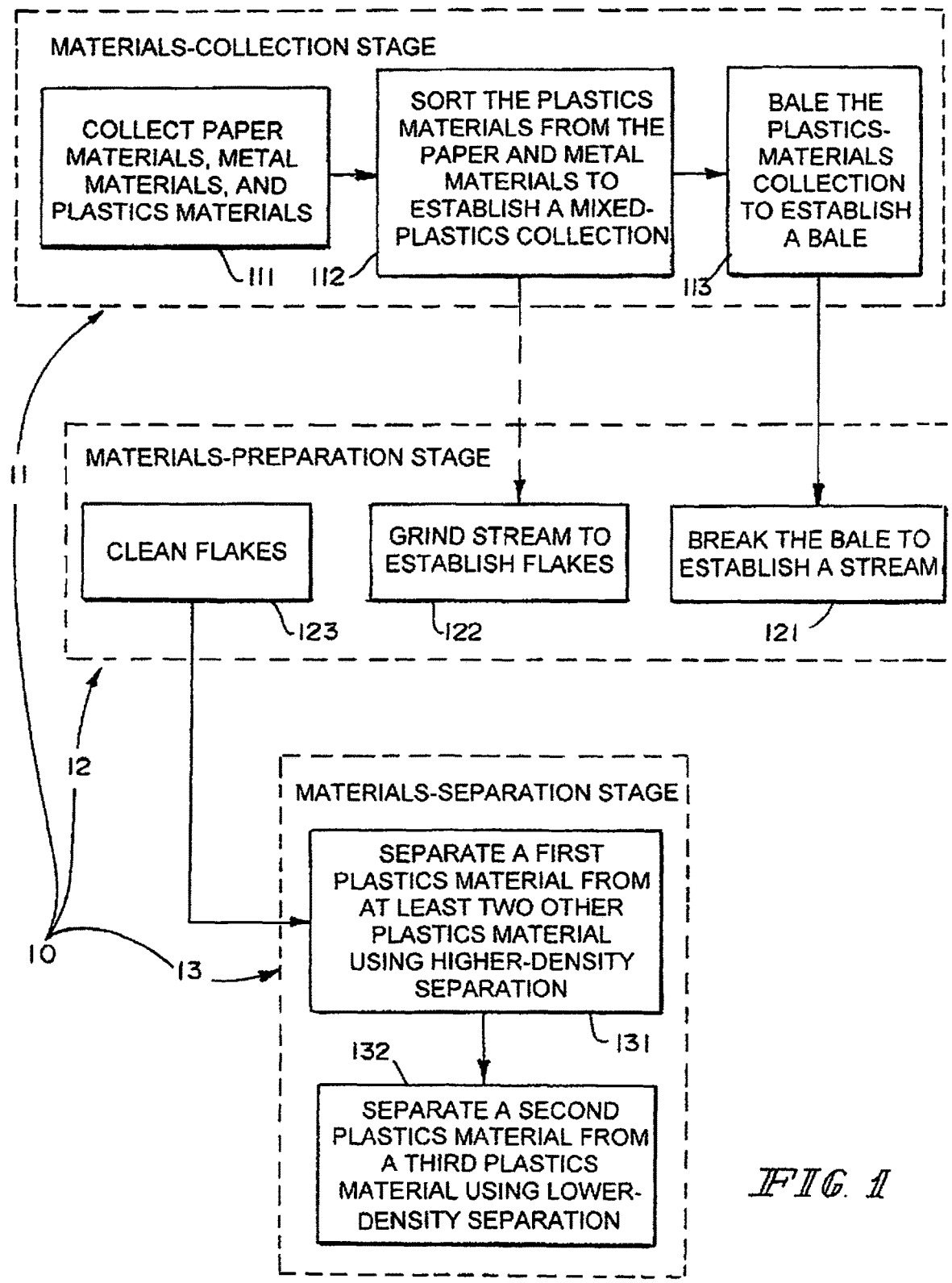
FIG. 1 is a diagrammatic view of a materials-separation process in accordance with the present disclosure suggesting that the process comprises three stages including (1) a materials-collection stage in which paper, metal, and plastics materials are first collected and combined and thereafter the metal and paper materials are separated from the plastics materials and the plastics materials are then baled to establish a mixed-plastics bale; (2) a materials-preparation stage in which the mixed-plastics bale is first broken apart, then ground to produce a mixture of flakes made of several plastics materials, and then cleaned to remove contaminants; and (3) a materials-separation stage in which a first plastics material is removed from the mixture of flakes using a higher-density separation operation and then a second plastics material is separated from a third plastics material using a lower-density separation operation.

A materials-separation process 10 in accordance with the present disclosure is shown, for example, diagrammatically in FIG. 1 and illustratively in FIG. 2. Materials-separation process 10 comprises three stages, which are illustratively a materials-collection stage 11, a materials-preparation stage 12, and a materials-separation stage 13. During materials-collection stage 11, recyclable materials 14 comprising plastics materials 100 including first, second, and third plastics materials 110, 120, and 150, metal materials 210, and paper materials 220 are collected in a collecting operation 111 and sorted in a sorting operation 112. During materials-preparation stage 12, plastics materials 100 are ground into flakes 170 in a grinding operation 122 and cleaned in a cleaning operation 123. Finally, during the materials-separation stage 13, flakes 170 are separated from one another using a higher-density separation operation 131 and then a lower-density separation operation 132 as shown in FIG. 2.

Materials-collection stage 11 illustratively includes collecting operation 111 in which recyclable materials 14 are collected by a materials-recovery facility, sorting operation 112 in which the materials-recovery facility sorts recyclable materials 14 to produce a plastics-materials collection 130 and a non-plastics materials collection 200, and baling operation 113 in which materials in plastics-materials collection 130 are baled to establish a mixed-plastics bale 140 as shown, for example, in FIGS. 1 and 2. In an illustrative embodiment, mixed-plastics bale 140 comprises at least first, second, and third plastics materials 110, 120, and 150.

Materials-preparation stage 12 includes at least a breaking operation 121 in which mixed-plastics bale 140 is broken apart to establish a stream 160 of plastics materials, a grinding operation 122 in which materials included in stream 160 are ground to produce flakes 170, and a cleaning operation 123 in which flakes 170 are cleaned as shown diagrammatically in FIG. 1 and illustratively in FIG. 2. Materials-preparation stage 12 is configured to produce flakes 170 which are cleaned and sized so that maximized separation of flakes 170 occurs during higher and lower density separation operations 131, 132 carried out in materials-separation stage 13.

Materials-separation stage 13 illustratively includes, in series, higher-density separation operation 131 and lower-density separation operation 132 as shown, for example, diagrammatically in FIG. 1 and illustratively in FIG. 2. During higher-density separation operation 131, higher-density fluid 22 separates first plastics material 110 (rectangle-shaped first plastics material flakes 110R) from second plastics material 120 (circle-shaped second plastics material flakes 120C) and from third plastics material 150 (triangle-shaped third plastics material flakes 150T) as shown illustratively in FIG. 2. During lower-density separation operation 132, lower-density fluid 32 separates second plastics material 120 (circle-shaped second plastics material flakes 120C) from third plastics material 150 (triangle-shaped third plastics material flakes 150T) as shown in FIG. 2.

Higher-density separation operation 131 illustratively uses a higher-density fluid separator 24 that is filled with higher-density fluid 22 to separate first plastics material 110 from second and third plastics material 120 and 150 based on their densities, as shown in FIG. 2. As an example, mixed-plastics bale 140 includes first, second, and third plastics materials 110, 120, and 150. Flakes 170 includes first plastics material flakes 11 OR made of first plastics material 110, second plastics material flakes 120C made of second plastics material 120, and third plastics material flakes 150T made of third plastics material 150 are introduced into higher-density fluid separator 24 that is filled with higher-density fluid 22 as shown in FIG. 2. First plastics material flakes 110R have a first material density greater than a first fluid density of higher-density fluid 22 and sink as a result. Second and third plastics material flakes 120C, 150T float as a result of having second and third material densities that are less than the first fluid density of higher-density fluid 22.

Flakes 170 are introduced continuously into higher-density fluid separator 24. As an example, higher-density fluid separator 24 is a higher-density float tank 24. Higher-density float tank 24 uses gravity to separate flakes 170 and agitation to maximize separation of the plastics materials 110, 120, and 150. As shown in FIG. 2, agitation and movement of flakes 170 along a length of higher-density float tank 24 is performed by augers 26. Augers 26 are shown illustratively on a bottom of higher-density float tank 24 and are further configured to remove first plastics material 110 after they have sunk to a bottom of higher-density float tank 24. A conveyor belt 28 is arranged at an exit end of higher-density float tank 24 and is configured to remove floating second and third plastics materials 120, 150. While augers and conveyor belts are shown, any other suitable removal and agitation methods may be used.

Higher-density fluid separator 24 may also be a higher-density fluid hydrocyclone which uses centripetal force to magnify variations in density between first, second, and third plastics material flakes 110R, 120C, and 130T, and higher-density fluid 22. As an example, the higher-density fluid hydrocyclone may be a Flottweg SORTICANTER® provided by Flottweg Separation Technology, Vilsbiburg, Germany. However, any other suitable hydrocyclone may be used.

As an example, lower-density separation operation 132 illustratively uses a lower-density fluid separator 34 that is filled with lower-density fluid 32 to separate plastics materials 120, 150 from one another based on their densities, as shown in FIG. 2. As an example, plastics materials 120, 150 are added to lower-density fluid separator 34 that is filled with lower-density fluid 32. Third plastics material 150 has a third material density that is less than lower-density fluid 32 and will float in lower-density fluid 32 as shown in FIG. 2. In comparison, second plastics material 120 has a second material density that is greater than lower-density fluid 32 and will sink in lower-density fluid 32 as shown in FIG. 2.

Illustratively, flakes 120C, 150T are introduced continuously into lower-density fluid separator 34. As an example, lower-density fluid separator 34 is a lower-density float tank 34. After flakes 120C, 150T are introduced into lower-density float tank 34, flakes 120C, 130T are then agitated to maximize separation of the plastics materials 120, 150. As shown in FIG. 2, agitation and movement of flakes 170 along a length of lower-density float tank 34 is performed by augers 26. Augers 26 are shown illustratively on a bottom of lower-density float tank 34 and are configured to remove second plastics material 120 after they have sunk to a bottom of lower-density float tank 34. A conveyor belt 28 is arranged at an exit end of lower-density float tank 34 and is configured to remove third plastics material 150 which floats on lower-density fluid 32. While augers and conveyor belts are shown, any other suitable removal and agitation methods may be used.

Lower-density fluid separator 34 may also be a lower-density fluid hydrocyclone which uses centripetal force to magnify variations in density between second and third plastics material flakes 120C and 130T and lower-density fluid 32. As an example, the lower-density fluid hydrocyclone may be a Flottweg SORTICANTER® provided by Flottweg Separation Technology, Vilsbiburg, Germany. However, any other suitable hydrocyclone may be used.

First plastics material 110 illustratively has a first material density in the range of about 1.05 g/cm$^3$ to about 1.5 g/cm$^3$. As an example, first plastics material 110 is Polyethylene Terephthalate (PET) having a density in a range of about 1.32 g/cm$^3$ to about 1.38 g/cm$^3$. As another example, first plastics material is PolyStyrene (PS) having a density in a range of about 1.05 g/cm$^3$ to about 1.1 g/cm$^3$. As another example, first plastics material may be a mixture of PET and PS. As a result of higher-density fluid 22 having a density of about 1.0 g/cm$^3$, both PS and PET sink in higher-density fluid 22 during higher-density separation operation 131.

Second plastics material 120 illustratively has a second material density in a range of about 0.94 g/cm$^3$ to about 0.99 g/cm$^3$. As an example, second plastics material 120 is High Density Polyethylene (HDPE) having a material density in a range of about 0.94 g/cm$^3$ to about 0.96 g/cm$^3$.

Third plastics material 150 illustratively has a third material density in a range of about 0.89 g/cm$^3$ to about 0.92 g/cm³. As an example, third plastics material 150 is illustratively Polypropylene (PP). As a result of both HDPE and PP having densities less than higher-density fluid 22, both HDPE and PP float in higher-density fluid 22 while PET and PS sink in higher-density fluid 22. Any other suitable plastics having a density greater than the first fluid density may be separated from any other suitable plastics having a density less than the first fluid density in higher-density separation operation 131.

As an example, higher-density fluid 22 is water having a density of about 1.0 g/cm³. Higher-density fluid 22 may also include additives or modifiers to increase oxidative stability, decrease surface tension, and modify density.

HDPE and PP cannot be separated from one another using higher-density separation operation 131 because both HDPE and PP have densities less than the density of higher-density fluid 22. As a result, HDPE and PP are separated from one another during lower-density separation operation 132 because the second fluid density of lower-density fluid 32 is between the second and third material densities. Lower-density fluid 32 used in lower-density separation operation 132 has the second fluid density which is in a range of about 0.91 g/cm³ to about 0.96 g/cm³.

As an example, lower-density fluid 32 is vegetable oil having a density in a range of about 0.91 g/cm³ to about 0.94 g/cm³. The vegetable oil is illustratively soybean oil, but may be rape seed oil, sunflower seed oil, coconut oil, cotton seed oil, linseed oil, or any other suitable alternative vegetable oil. Soybean oil has a density in the range of about 0.92 g/cm³ to about 0.93 g/cm³ which causes PP (density of less than about 0.92 g/cm³) to float on lower-density fluid 32 and HDPE (density of greater than 0.94 g/cm³) to sink in lower-density fluid 32. Lower-density fluid 32 may also include additives or modifiers to increase oxidative stability, decrease surface tension, and modify density.

During collecting operation 111 of materials-collection stage 11, recyclable materials 14 illustratively includes paper materials 220, metal materials 210, and plastics materials 100. As an example, recyclable materials 14 are collected in a single-stream collection program in which paper materials 220, metal materials 210, and plastics materials 110 are collected together in a recycling bin 16 by a materials-recovery facility as suggested in FIG. 1. Plastics materials 100 illustratively includes first plastics material 110 (PET), second plastics material 120 (HDPE), and third plastics material 150 (PP). PP, HDPE, and PET are used as an example because PP, HDPE, and PET are common types of plastics materials found in the recycling stream.

As an alternative, recyclable materials may include primarily only plastics materials 100. As an example, recyclable materials may be sorted into plastics-materials collections and non-plastics materials collections by the consumer prior to collecting operation 111. Downstream sorting operation 112 may still be used to remove any metal materials or paper materials which may be contaminating the plastics-materials collection established by the consumer.

Another method of pre-sorting plastics materials from metal and paper materials is by using a deposit program. In a deposit program, consumers sort plastics materials from paper and metal materials and then return the plastics materials to their place of purchase to receive back a deposit paid previously on the plastics material. The materials-recovery facility then collects plastics-materials collection 130 from the place of purchase. Again, downstream sorting operation 112 may still be used to remove any metal or paper materials which may be contaminating plastics-materials collection 130 established at the place of purchase.

Finally, collecting operation 111 may be omitted from the materials separation process when recyclable materials are dropped off at the materials-recovery facility by consumers in a drop-off program. When using a drop-off program, consumers may pre-sort their recyclable materials into plastics-materials collection 130 and non-plastics materials collection 200 before dropping off plastics-materials collection 130 or consumers may drop off all their recyclable materials mixed together. Downstream sorting operation 112 may be used regardless of the manner in which the consumer drops off their recyclable materials to remove any metal or paper materials which may be intermixed or contaminating plastics-materials collection 130.

Plastics materials 100 are categorized and labeled by manufacturers of plastics materials to help improve sorting of plastics materials 100. As an example, a milk jug includes a triangle-shaped chasing-arrows resin identification code with a number 2 positioned in the triangle that is molded on the bottom of the milk jug. The number 2 resin identification code communicates that the milk jug is made from HDPE. At present, plastics materials 100 are separated into seven categories with each category having its own resin identification code. Plastics materials include PET having a number 1 resin identification code, HDPE having the number 2 resin identification code, Polyvinyl Chloride (PVC) having a number 3 resin identification code, Low Density Polyethylene (LDPE) and Linear Low Density Polyethylene (LLDPE) both having a number 4 resin identification code, PP having a number 5 resin identification code, Polystyrene (PS) having a number 6 resin identification code, and other miscellaneous plastics having a number 7 resin identification code.

During sorting operation 112, plastics materials 100 are separated from metal materials 210 and paper materials 220. As an example, sorting may be done by moving recyclable materials 14 along a conveyor belt 18 and human operators (not shown) manually removing metal and paper materials 210, 220 from plastics materials 100. While manual sorting is suggested, any other suitable sorting methods may be used. Sorting operation 112 establishes plastics-materials collection 130 and non-plastics materials collection 200 as shown in FIG. 2.

Sorting operation 112 may further include optical sorting in which a machine uses near infrared light or other suitable optical sorting means to separate plastics materials. Optical sorting may be used to remove some plastics materials from other plastics materials. As an example, optical sorting may be used to remove PET from HDPE to eliminate the need for higher-density separation operation 131. Higher-density separation operation 131 could be eliminated as a result of first plastics material 110 (PET) having already been removed from the plastics-materials collection. The resulting plastics-materials collection would include HDPE, but materials-preparation stage 12 and lower-density separation operation 132 of materials-separation stage 13 would still be needed. As an example, bottles (detergent bottles) made of second plastics material 120 (HDPE) are often mated with bottle caps made of third plastics material 130 (PP). Optical sorting may identify a HDPE bottle, but would not separate a PP bottle cap coupled to the container.

After plastics-materials collection 130 is established, the materials included in plastics-materials collection 130 are baled together to establish a bale 140 in baling operation 113 as shown in FIG. 2. Bales 140 are established to ease storage and transportation of plastics materials 100.

A materials-recovery facility, as suggested previously, may collect any combination of plastics materials. As an example, during materials-collection stage 11, shown in FIGS. 1 and 2, plastics materials 110, 120, and 150 are collected, sorted from other non-plastics materials 210, 220, and illustratively baled together. As a result, mixed-plastics bale 140 includes first, second, and third plastics materials 110, 120, and 150. As another example, materials-recovery facility may only collect second plastics material 120 in an attempt to produce a plastics material bale comprising only second plastics material 120. However, a plastics material bale often includes an amount of second plastics material 120 in the form of contamination.

In materials-preparation stage 12, each mixed-plastics bale 140 is broken apart using a bale breaker or other suitable device to establish a stream 160 of plastics materials during bale-breaking operation 121 as shown in FIG. 2. However, baling operation 113 and breaking operation 121 may be omitted if sorting operation 112 is performed in the same facility as materials-preparation stage 12. As an example, plastics-material collection 130 may be transported to grinding operation 122 directly as stream 160. Materials in stream 160 may be cleaned using a cold-water wash, magnetic separation, eddy current separation, or manual separation prior to grinding to remove contaminants or non-desirable materials that may have been left in plastics materials 100 during collecting operation 111 or missed during sorting operation 112.

During grinding operation 122, a grinder 20 grinds material included in stream 160 into about one inch square or smaller flakes 170 as shown in FIG. 2. As an example, flakes 170 comprise first plastics material flakes 110R, second plastics material flakes 120C, and third plastics material flakes 150T. Flakes 170 are sized to maximize the effectiveness of subsequent cleaning operation 123 and separation operations 131, 132.

Flakes 170 are then washed to remove any contaminants in cleaning operation 123. As an example, cleaning operation 123 may include another magnetic separation, hot-water wash, and cold-water wash. Magnetic separation at this operation is performed to remove metal not previously removed or metal lost by grinder 20 during grinding operation 122. Hot-water wash may be used to remove contaminants from the plastics materials which have permeated the plastics materials, like odors. A cold-water wash is then used to rinse contaminants left on a surface of flakes 170. While a general washing process is shown in FIG. 2, any suitable combination of washes may be used to remove contaminants.

As shown in FIGS. 1 and 2, materials-separation process 10 is used to sort plastics materials 100. However, materials separation process may also be used as a purification process when the bale is intended to comprise substantially only one plastics type. As an example, bales sold as having only a single type of plastics material may include other plastics material types in the form of contamination. A bale may be marked as containing only second plastics material 120, but may have significant amounts of third plastics material 150. As a result, the materials-separation stage of the materials separation process may include only lower-density separation operation 132 as the two plastics materials 120, 150 both float during higher-density separation operation 131. Thus, lower-density separation operation 132 may be used alone when only second and third plastics material flakes are formed from grinding the bale.

In some instances, the materials separation process may include a post-separation cleaning operation to remove lower-density fluid 32 from second and third plastics materials 120, 150. During lower-density separation operation 132, lower-density fluid 32 may adhere to second and third plastics materials 120, 150. Lower-density fluid 32 may be removed to aid in post-separation transportation, storage, and processing. Lower-density fluid 32 may be removed from second and third plastics materials 120, 150 in a manner similar to cleaning operation 123 and may also include the use of some detergent to aid in the removal of lower-density fluid 32.

Plastics materials 100 are illustratively Post-Consumer Resin (PCR). Post-Consumer Resin is plastics materials recovered after consumers have used the plastics materials for their intended purpose. As an example, an empty milk jug collected by the materials-recovery facility is considered PCR. Plastics materials 100 may also be Post-Industrial Resin (PIR). PIR is plastics materials recovered after a plastics-materials manufacturer has used the plastics materials. As an example, scrap plastics parts which are not suitable for sale to consumers, may be considered PIR. Plastics materials 100 may be virgin resin. Virgin resin is plastics materials which have not yet been processed by a plastics-materials manufacturer. As an example, virgin resin may become contaminated with other PCR, PIR, or other virgin resins prior to processing.

Materials-separation process 10 maximizes the availability of high-quality PCR, PIR, and virgin resin as a result of the plastics materials being sorted from one another. As an example, PCR may include first plastics material 110 (illustratively PET) and second plastics material 120 (illustratively HDPE) as these plastics material types are collected commonly by material recovery facilities. PCR may also include third plastics material 150 (illustratively PP) as well as other plastics material types such as PVC, LDPE, and PS as a result of more material recovery facilities accepting all types of plastics materials. Sorted plastics materials have increased values when compared to mixed-plastics materials. As an example, a sorted plastics material bale of PP may be worth many times the value of a mixed-plastics bale including PVC, LDPE, PP, and PS.

As suggested in FIGS. 1 and 2, sorting operation 112 may include manual sorting. As a result of sorted plastics material bales being more valuable than mixed-plastics material bales, material recovery facilities often attempt to sort some plastics materials from other plastics materials. As an example, PET may be sorted easily from HDPE because PET is clear while HDPE is not clear. However, typical line speeds for manual sorting are too fast to remove substantially all other plastics materials. As a result, contamination of the sorted plastics materials is often present. Materials-separation stage 13 of materials-separation process 10 sorts bulk mixed-plastics materials. Both water and vegetable oil may be used as a separation medium to separate plastics materials from one another as both water and vegetable oil are non-volatile and accessible.

Materials-separation stage 13 minimizes costs by maximizing sorting efficiency. Materials-separation stage 13 also maximizes reliability as it reduces errors associated with human operators sorting manually plastics materials. Lower-density separation operation 132 also permits the separation of second plastics material 120 (HDPE) from third plastics material 150 (PP) even though both plastics materials often look substantially the same without seeing the resin identification codes.

The invention claimed is:

1. A separation process comprising:
   introducing a plastics material having a first material density and a plastics material having a second, different material density into a tank,
   separating the plastics material having a first material density from the different plastics material having a second material density using fluid comprising vegetable oil and an additive, wherein the separating includes agitating in the tank,
   wherein the fluid has a fluid density greater than the second material density.

2. The separation process of claim 1, wherein the second material density is in a range of 0.89 g/cm$^3$ to less than 0.92 g/cm$^3$.

3. The separation process of claim 2, wherein the fluid density is in a range of 0.92 g/cm$^3$ to 0.94 g/cm$^3$.

4. The separation process of claim 3, wherein the fluid density is in the range of 0.92 g/cm$^3$ to 0.93 g/cm$^3$.

5. The separation process of claim 4, wherein the fluid density is in the range of 0.924 g/cm$^3$ to 0.928 g/cm$^3$.

6. The separation process of claim 3, wherein the first material density is in a range of 0.94 g/cm$^3$ to 0.97 g/cm$^3$.

7. The separation process of claim 1, further comprising the operation of cleaning the first plastics material and the second plastics materials to remove contaminants adhering to the first and second plastics materials.

8. The separation process of claim 7, wherein the operation of cleaning happens before the operation of separating.

9. The separation process of claim 8, wherein the second material density is in a range of 0.89 g/cm$^3$ to less than 0.92 g/cm$^3$.

10. The separation process of claim 9, wherein the fluid density is in a range of 0.92 g/cm$^3$ to 0.94 g/cm$^3$.

11. The separation process of claim 10, wherein the fluid density is in the range of 0.924 g/cm$^3$ to 0.928 g/cm$^3$.

12. The separation process of claim 10, wherein the first material density is in a range of 0.94 g/cm$^3$ to 0.97 g/cm$^3$.

13. The separation process of claim 1, wherein the additive is configured to maximize oxidative stability of the vegetable oil.

14. The separation process of claim 13, wherein the second material density is in a range of 0.89 g/cm$^3$ to less than 0.92 g/cm$^3$, the fluid density is in a range of 0.92 g/cm$^3$ to 0.94 g/cm$^3$, and the first material density is in a range of 0.94 g/cm$^3$ to 0.97 g/cm$^3$.

15. The separation process of claim 14, further comprising the operation of cleaning the first plastics material and the second plastics materials to remove contaminants adhering to the first and second plastics materials.

16. The separation process of claim 15, wherein the operation of cleaning happens before the operation of separating.

17. The separation process of claim 1, wherein the additive is configured to decrease surface tension.

18. The separation process of claim 17, wherein the second material density is in a range of 0.89 g/cm$^3$ to less than 0.92 g/cm$^3$, the fluid density is in a range of 0.92 g/cm$^3$ to 0.94 g/cm$^3$, and the first material density is in a range of 0.94 g/cm$^3$ to 0.97 g/cm$^3$.

19. The separation process of claim 18, further comprising the operation of cleaning the first plastics material and the second plastics materials to remove contaminants adhering to the first and second plastics materials.

20. The separation process of claim 19, wherein the operation of cleaning happens before the operation of separating.

* * * * *